United States Patent
Mani et al.

(10) Patent No.: US 9,291,467 B2
(45) Date of Patent: Mar. 22, 2016

(54) METHODS AND SYSTEMS FOR LOCATING CONTACTS

(75) Inventors: Manjunath Mani, Bangalore (IN); Santhosh Sreenivasan, Bangalore (IN)

(73) Assignee: Harman International Industries, Inc., Farmington Hills, MI (US)

( * ) Notice: Subject to any disclaimer, the term of this patent is extended or adjusted under 35 U.S.C. 154(b) by 102 days.

(21) Appl. No.: 13/537,871

(22) Filed: Jun. 29, 2012

(65) Prior Publication Data

US 2014/0005944 A1 Jan. 2, 2014

(51) Int. Cl.
*G01C 21/00* (2006.01)
*H04W 4/02* (2009.01)
*G01C 21/34* (2006.01)
*G01C 21/36* (2006.01)

(52) U.S. Cl.
CPC ............ *G01C 21/343* (2013.01); *G01C 21/362* (2013.01); *H04W 4/02* (2013.01); *H04W 4/023* (2013.01)

(58) Field of Classification Search
CPC .... H04W 4/02; G01C 21/362; G01C 21/3688
USPC ................. 701/206, 411, 422, 442, 482, 537; 455/456.1, 456.2
See application file for complete search history.

(56) References Cited

U.S. PATENT DOCUMENTS

| | | | |
|---|---|---|---|
| 6,763,299 B2 * | 7/2004 | Jones | 701/537 |
| 7,107,064 B2 * | 9/2006 | Ito | 455/456.1 |
| 7,239,960 B2 * | 7/2007 | Yokota et al. | 701/533 |
| 7,254,400 B1 * | 8/2007 | Sakakura | 455/456.1 |
| 2010/0029302 A1 * | 2/2010 | Lee et al. | 455/456.6 |
| 2010/0241346 A1 * | 9/2010 | Waris | 701/201 |
| 2012/0143496 A1 * | 6/2012 | Chitre et al. | 701/428 |

OTHER PUBLICATIONS

Firth, Niall. "How Do I Get to China? Jet Ski! Google Maps Joke Gives Users Unothodox Instructions for Crossing the Pacific." Daily Mail. Nov. 1, 2010. Web. May 13, 2015. <http://www.dailymail.co.uk/sciencetech/article-1324917/Google-Maps-joke-give-users-unorthodox-instructions-crossing-Pacific.html>.*
Cell Phone Trackeing/GPS Mobile Phone Tracking, buddyway.com; http://www.buddyway.com, May 31, 2012.
Google Latitude, http://www.google.com/mobile/latitude, May 31, 2012.
Mobile Phone Tracking, Wikipedia, http://en.widipedia.org/wiki/Mobile_phone_tracking, May 31, 2012.

* cited by examiner

*Primary Examiner* — John Q Nguyen
*Assistant Examiner* — Anshul Sood
(74) *Attorney, Agent, or Firm* — Michael Spenner

(57) ABSTRACT

Various embodiments relate to determining a location of a contact. A request may be transmitted from a vehicle computer to locate one or more contacts remote from a vehicle. A response to the request transmitted from a communication device of the one or more contacts may be received at the vehicle computer. The location of the one or more contacts may be determined. Instructions to navigate to the location may be received at the vehicle computer and a route may be calculated based on the one or more contacts' location. A status of the response to the request to locate may be output.

27 Claims, 5 Drawing Sheets

METHODS AND SYSTEMS FOR LOCATING CONTACTS

TECHNICAL FIELD

Various embodiments relate to methods and systems for locating one or more contacts using a communication device. In some embodiments, the search for personal contacts may occur using a vehicle head unit.

BACKGROUND

Social media has enabled users to track and stay current on events in the lives of the user's friends, family and other contacts so long as the contacts share or post the events with the users. For example, the location of the contact may be provided by the contact for updating the user on the contact's current activity. The user can obtain the location of the contacts using software that is installed on a personal computer and/or a mobile phone. When the user is in a vehicle, however, tracking the location of a contact can be challenging using either of these devices.

Additionally, the user may not only want to know the location of a contact. For the vehicle user, additional information is likely needed.

SUMMARY

A system for determining a location of a contact includes a vehicle computer. The vehicle computer may be configured to transmit a request to locate one or more contacts remote from a vehicle. A response to the request to locate may be received at the vehicle computer which may be transmitted from a communication device of the one or more contacts. In some embodiments, the response may be automatically transmitted from the communication device based on an identity of a requester.

A location of the one or more contacts may be determined. Further, a determination may be made if instructions to navigate to the location are received and, if instructions are received, a route based on the one or more contacts' location may be calculated. The vehicle computer may be further configured to output information relevant to a status of the response to the request to locate.

In some embodiments, the status may be to share the location and the information relevant to the status may be the calculated route which may output via the vehicle computer. If instructions to navigate to the location are not received, the information relevant to the status may be the location of the one or more contacts. The location may be output, for example, as an address, partial address, point of interest, location on a street, a highway location, or a cross street.

The response and status may alternatively be a rejection of the request. In some embodiments, the rejection may be due to an expiration of a timeout period for response by the one or more contacts to the request to locate.

One non-limiting example of the communication device may be a mobile device. Another non-limiting example may be a head unit in a vehicle.

In some embodiments, the transmitted request may include a phone number of an embedded device in a vehicle of the one or more contacts.

A computer-implemented method of determining a location of one or more contacts may include receiving input at a vehicle computer identifying one or more contacts remote from a vehicle to locate. A request to share a location of the one or more contacts may be transmitted via the vehicle computer for output on a communication device of the identified one or more contacts. For example, one or more messages may be transmitted over a vehicle network to a communication module in the vehicle. The request to share a location of the one or more contacts may be transmitted via the vehicle communication module to a communication device of the one or more contacts and the request may be output on the communication device of the identified one or more contacts; A response to the request may be received at the vehicle computer via the communication device. From the response, it may be determined that the one or more contacts have agreed to share the location. The location of the one or more contacts may be determined and the location may be output at the vehicle computer.

In some embodiments, one or more messages may be output at the vehicle computer requesting instructions for navigating to the location. Depending on a response to the one or more messages requesting instructions for navigating to the location, a route to the location of the one or more contacts may or may not be output. In response to receiving instructions to navigate to the location, a route to the one or more contacts' location may be calculated based on the location of the one or more contacts.

Non-limiting examples of the input identifying the one or more contacts may be a name of the one or more contacts or a phone number associated with the communication device of the one or more contacts. In some embodiments, the request to share the location may be transmitted once a connection is established. The method may include transmitting a connection request to the communication device. The method may further include determining that a connection cannot be established with the communication device. The connection request to one or more other communication devices of the one or more contacts may be transmitted for establishing the connection. In some embodiments, the request to share a location may be received on the communication device as a text message.

In some embodiments, it may be determined that the one or more contacts is moving. Based on determining that the one or more contacts is moving, the location of the one or more contacts is determined as a general vicinity or area.

A computer program product embodied on a computer readable medium for determining a location of one or more contacts may have computer-readable instructions for receiving input defining a request to locate one or more contacts remote from a vehicle. Based on the request, further instructions may be for transmitting one or more messages via a vehicle computer to one or more communication devices of one or more contacts requesting instructions from the one or more contacts to share a location.

Additional instructions may be for receiving instructions with respect to sharing the location of the one or more contacts. Based on the instructions, a location of the one or more contacts may be determined.

Further instructions may be for outputting one or more requests for instructions to navigate to the location of the one or more contacts. User instructions to navigate to the location of the one or more contacts may be received and computer instructions for calculating and outputting a route based on the location may be transmitted.

In some embodiments, the location may be determined for multiple contacts. A route schedule may be received for routing to each of the locations of the multiple contacts and the computer instructions for calculating and outputting the route may be transmitted according to the route schedule. In some embodiments, the route schedule may be based on proximity to the location of at least one of the multiple contacts. In some embodiments, the location of at least one of the multiple contacts may be confirmed before moving to another location according to the route schedule.

In some embodiments, the one or more contacts may be moving. A route to the one or more contacts may be calculated based on proximity to the vehicle. In additional or alternative embodiments, the route to the location of the one or more contacts may be determined as not navigable by a vehicle. One or more messages at a vehicle computer may be output at a vehicle computer notifying a passenger that the route is not navigable by vehicle.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Additionally, the disclosure and arrangement of the figures is non-limiting. Accordingly, the disclosure and arrangement of the figures may be modified or re-arranged to best fit a particular implementation of the various embodiments of the invention.

Communication between a vehicle and an external network is becoming more ubiquitous through the use of infotainment systems in vehicles. Although traditionally used for telematics services, some infotainment system include a limited set of enhanced offerings beyond just telematics services. Leveraging the modern enhancements of a infotainment system, a software tool for locating one or more contacts can be useful, especially when living in a big city or visiting a new town, among other uses. While a user may have the ability to locate a contact using, for example, a mobile phone, it can pose a challenge when the user is driving. For example, many regions of the world have laws which restrict a driver from using a mobile phone while driving. To comply with these laws, some vehicles automatically block mobile phone use when the vehicle is moving. Also, many drivers do not use a mobile phone in a vehicle as a personal preference.

Further, the user may desire additional information than simply the contact's location. As one example, the user may desire to navigate to the contact for which a plurality of manual steps may need to be carried out in order to reach the location. In addition to the possible inconvenience to the user, carrying out the plurality of manual steps may be distracting to a driver. In regions of the world where mobile phone use while driving is restricted, these manual steps cannot be carried out at all.

Figure 1:
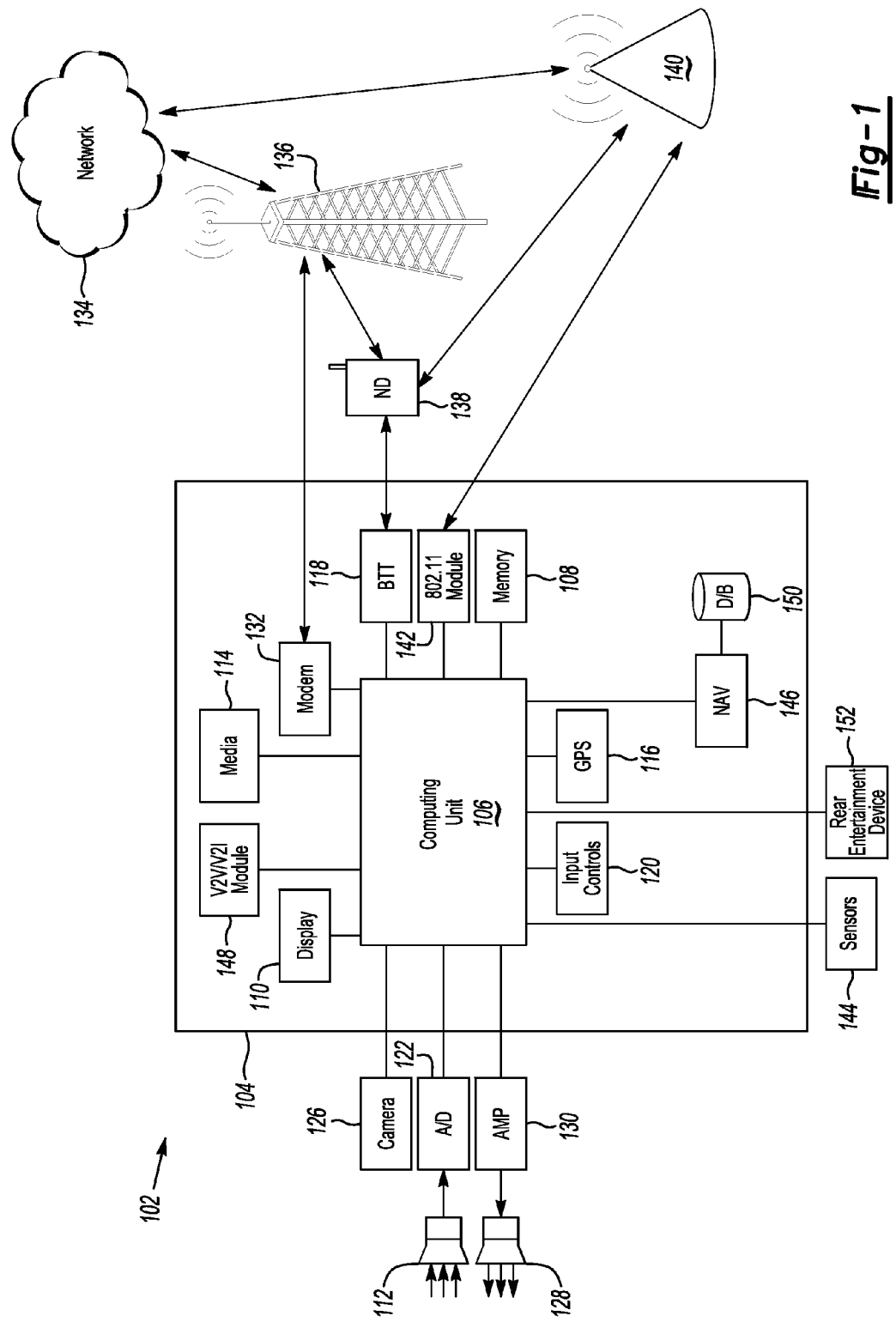
FIG. 1 is a block diagram of the system architecture of a vehicle computing system.

FIG. 1 is a block diagram of a vehicle computing system (VCS) 102. Within a vehicle, a head unit 104 may have an onboard computing unit 106 comprised of one or more processors (not shown) that provide for on-board processing of instructions and controls received by the VCS 102. The processor may be, for example, an OMAP processor.

Data that may be received and processed by the onboard computing unit 106 may be stored in memory 108. The memory 108 may include non-persistent or volatile memory, such as (and without limitation) random access memory (RAM), and persistent or non-volatile memory, such as (and without limitation) a hard disk drive (HDD) or flash memory.

The head unit 104 may also include a visual front end interface, such as a display 110, located in the vehicle. The display 110 may be an LCD display or a graphical display. In some embodiments, the interface may have a touch sensitive screen. In additional or alternative embodiments, the interaction with the VCS 102 may occur through, button presses, audible speech and/or speech synthesis and displayed on display 110.

The VCS 102 is also provided with a number of different modules through which the user can interface or interact with the VCS 102. For example, the vehicle may be provided with a microphone 112, one or more media components 114 (e.g., and without limitation, one or more media inputs, such as, and without limitation, an auxiliary input or USB input for connected devices, a radio, a CD/DVD player, satellite radio, and the like), a GPS module 116, and a BLUETOOTH module 118. Additional media components may include one or more rear entertainment devices 152. The rear entertainment device 152 may include one or more media players (e.g., a DVD player) and one or more displays visible to rear seat passengers from which video, picture and/or audio may be output.

The computing unit 106 may be in communication with a vehicle network (not shown) that communicates data to and from the various modules. Non-limiting examples of a vehicle network include an SAE J1850 bus, a CAN bus, a GMLAN bus, and any other like vehicle data buses. The vehicle network may additionally or alternatively be a network for use with infotainment systems such as a media oriented system transport (MOST), Ethernet, or an Audio-Video Bridge (AVB) network.

Additional modules of the VCS 102 may include one or more vehicle cameras 126. The vehicle cameras 126 may be front or rear view cameras and/or in the vehicle. For purposes of simplicity, a single camera 126 is shown at the front of the vehicle. The output of the camera(s) 126 may be presented on the display 110. One or more input controls 120 may also be provided to allow a user to swap between and activate various modules.

Signals passing from the microphone 112 may pass through one or more analog-to-digital converters 122 before being passed to the processor 106 and vice-versa. Additionally, signals to and from some media components 114 (e.g., AM/FM radio) may also pass through one or more A/D converters 122 before being passed to or from the onboard computing unit 106. For purposes of simplicity, one A/D converter 122 is shown. However, multiple A/D converters 122 may be arranged in the system 102.

The output from one or more vehicle modules of the VCS 102 may be audible and/or visual output. Audible output may be output from one or more in-vehicle speakers 128. The speaker(s) 128 may be connected to an amplifier 130 and may receive its signal from the processor 106. In some cases, the signals may pass through a digital-to-analog (D/A) converter (not shown). Visual outputs may be output on the display 110 and/or on one or more rear entertainment devices 152.

The vehicle may include an on-board modem 132 for two-way communication of data and messages between the vehicle and an external network 134. As a non-limiting example, modem 132 may be a USB cellular modem. As an alternative example, the modem may be an embedded modem in the vehicle. The data and messages may be exchanged by communicating with the one or more cellular towers 136.

Alternatively, via a BLUETOOTH transceiver 118 in the vehicle, a communication or pairing may be made automatically with a user's portable (sometimes referred to as "nomadic") device 138 (e.g., mobile phone, smart phone, PDA, or any other device having wireless remote network connectivity) after a vehicle key-on. In some embodiments, pairing the portable device 138 and the BLUETOOTH transceiver 118 may be instructed through one or more buttons or similar input (not shown). The one or more buttons may be one or more hard keys located in the vicinity of the vehicle driver (e.g., and without limitation, on the steering wheel, in the center console, or near the display 110) and/or one or more soft keys shown on the display 110. The soft keys may or may not be touch-sensitive (e.g, on a touchscreen display). Additionally or alternatively, the soft keys may be one or more physical buttons mapped to the one or more soft keys.

In yet an alternative embodiment, connectivity may be accomplished using a USB connection linking the nomadic device 138 with the head unit 104 via a USB module. In some embodiments, this connection may only be enabled using an accessory protocol. Non-limiting examples of accessory protocols include the IPHONE accessory protocol or the ANDROID accessory protocol.

Using the portable device 138, communication with an external network 134 may be accomplished through, for example, communication with a cellular tower 136 and/or a wireless access point 140. Data may be communicated from the vehicle (e.g., from the onboard computing unit 106) to the network 134 utilizing, for example, a data-plan, data over voice, or DTMF tones associated with nomadic device 138.

Additionally or alternatively, the vehicle may be outfitted with one or more wireless modules 142 for wireless communication with the network 134. A non-limiting example of such a wireless communication is any communication system meeting the 802.11 IEEE standard such as WiFi or WiMax. To communicate with the network 134, a connection may be made to a wireless hotspot 140 (or wireless access point) which may be outside and remote from the vehicle (e.g., and without limitation, at a publically available hotspot venue). In some embodiments, a wireless hotspot may be created in the vehicle and communication with the network 134 may be accomplished by wirelessly connecting one or more compatible devices in the vehicle with the in-vehicle wireless access point. For purposes of simplicity and clarity, FIG. 1 shows an external hotspot 140.

The computing unit 106 may be provided with an operating system including an API to communicate with modem application software. The modem application software may access an embedded module or firmware on the BLUETOOTH transceiver 118 to complete wireless communication with a remote BLUETOOTH transceiver (such as that found in a nomadic device).

The nomadic device 138 may be capable of voice band and/or broadband data communication. A user may be able to transfer data over the voice band using a technique called frequency division multiplexing. Thus, a user of the nomadic device 138 may be able to talk over the device while data is being transferred. If the user has a dataplan associated with the nomadic device 138, broadband transmission may be possible.

Incoming data to the VCS 102 may be passed through the nomadic device 138 via a data-over-voice or data plan through the onboard BLUETOOTH transceiver 118 and into the vehicle's computing unit 106. Alternatively, the data may be passed through the embedded modem 132 via cellular communication to the computing unit 106. In some embodiments, data communication with the VCS 102 may be via server push messages as supported by the embedded modem. Alternatively, the data may be passed through the wireless module 142 via, e.g., a WiFi connection, to the computing unit 106. Data may be stored in the memory 108 of the VCS 102.

A navigation module 146 may be executing on the head unit 104 for calculating and displaying navigation routes on display 110. Additionally, a navigation database 150 storing route information and map data may also be stored and executing on the head unit 104. In some embodiments, the navigation database 150 may be executing remotely on a remote system (not shown) and communicating with head unit 104 via network 134. Additional sources that may interface with the VCS 102 may include personal navigation devices and/or onboard GPS devices.

Additionally communicating with the VCS 102 may be a variety of other auxiliary devices connected through a wireless or wired connection. Auxiliary devices may include, but are not limited to, personal media players, wireless health devices, portable computers, and the like.

Additionally communicating with the computing unit 106 may be one or more sensors 144. Sensors 144 may comprise interior and/or exterior sensors. Interior sensors may monitor one or more vehicle components for vehicle concerns. Interior sensors may include, but are not limited to, brake sensors and one or more internal cameras. Exterior sensors may monitor events outside of the vehicle. As one non-limiting example, exterior sensors may be proximity sensors for detecting objects near the vehicle.

Additionally executing on the head unit 104 may be logic comprised of instructions for determining the location of one or more contacts. In some embodiments, the logic may be a software application downloaded and stored in memory 108 of the head unit 104. The logic may include instructions for establishing a connection with a communication device, exchanging information with the navigation system (e.g., module 146 and database 150) for routing to the location of one or more located contacts, outputting information visually (e.g., on display 110) and/or audibly (e.g., from speaker 128), and other instructions in accordance with the various embodiments. Additionally, the head unit 104 may be executing logic for receiving location requests from one or more other VCS. In some embodiments, the head unit 104 may execute logic for filtering suspicious requests for location information.

In some embodiments, one or more modules 148 for vehicle-to-vehicle (V2V) or vehicle-to-infrastructure (V2I) communication may also communicate with the computing unit 106. The module 148 may be for dedicated short range communications (DSRC), wireless access in vehicular environment (WAVE), WiFi, or other like wireless communication enabling V2V or V2I communication. The module(s) 148 may be transceivers that enable two-way short to medium range (e.g., up to 1000 meters) wireless communication capabilities. Typically, the dedicated short range communication works on a 5.9 GHz band with bandwidth of 75 MHz. In addition to being on-board in a vehicle, enabling vehicle to vehicle (V2V) communication with other capable vehicles, nodes may also be roadside units (RSUs) enabling vehicle to infrastructure (V2I) communication. V2V may be used to alert in two different vehicles about one vehicle approaching the other. The alerts may be a vehicle seat vibration, repeated brake light flashing, graphics shown on a display, and the like. The messages received during a V2V or V2I exchange are typically transmitted within the vehicle over a vehicle network.

Figure 2:
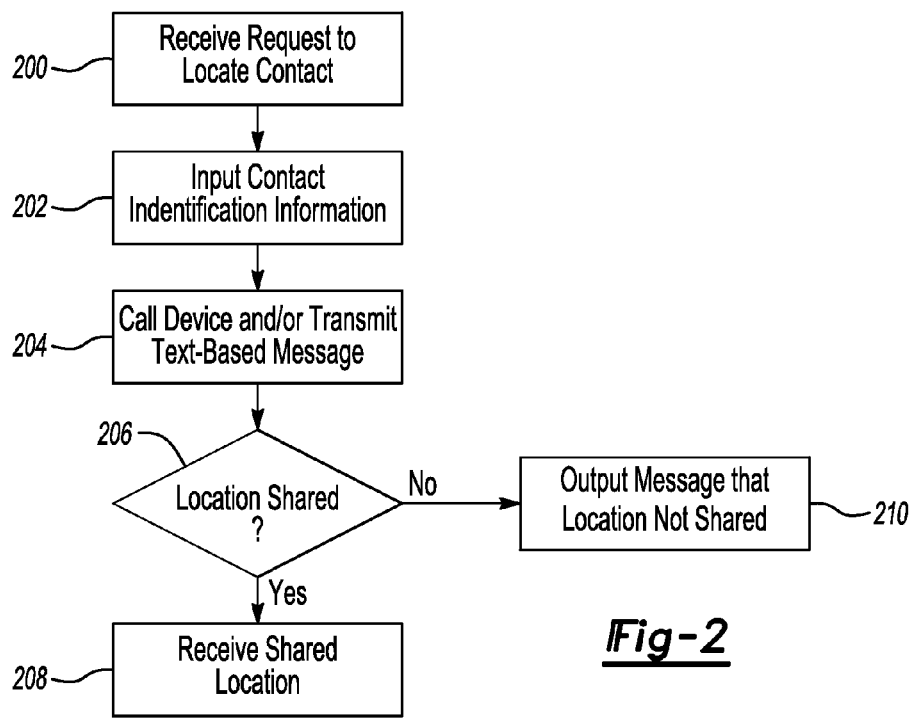
FIG. 2 is a process for establishing a communication channel between a vehicle and a contact's communication device in order to locate the contact.

FIG. 2 is a process performed via a head unit in the vehicle for requesting a contact's location. The request may be sent to a contact's communication device in order to locate the personal contact. A connection may be made between a vehicle and a communication device. The communication device may be a contact's mobile device (including, but not limited to, a mobile phone, tablet, personal computer, or personal digital assistant) or a contact's vehicle head unit 104. In all cases, the connection (and the request for one or more contacts' location) is requested from a vehicle.

A request to locate a contact (via the contact's communication device) may be received in the vehicle via the VCS 102 (block 200). The request may be received orally (through microphone 112) and/or tactually (e.g., via a touch-sensitive display 110 and/or one or more soft or hard vehicle buttons). The request may be input in order to initiate the search for a contact and activate the logic on the head unit 104 which instructs the process for locating a contact. A non-limiting example may be a verbal command that states "Locate." Alternatively or additionally, the command may be received tactually via a button to, for example, "Locate Contact."

Upon inputting the request, identification information about the contact may be input (block 202). The request may be received from a selection of one or more contacts in the vehicle user's contact list. Each contact may be associated with one or more contact numbers stored with the contact in memory of the nomadic device 138 and/or the head unit 104 for calling the contact in order to establish a connection. In some embodiments, each contact may be stored in a database (which may local on the head unit 104 or remote from it) with the contact's contact number. The contact number may be the contact's mobile phone number and/or the number of an embedded phone 132 in the vehicle. Additionally or alternatively, the user may input the contact number for the contact by inputting the digits of the contact number associated with the contact's communication device. In some embodiments, the vehicle user may locate multiple contacts in the same request.

In additional or alternative embodiments, the vehicle user may input a contact's name to initiate a connection with the contact. The vehicle user and one or more of the user's contacts may be part of a social network or may be subscribers to a service for locating contacts. As part of this service, the vehicle user may locate contacts who also subscribe to the service. To connect to a contact, the user may say or otherwise input (e.g., tactually) a command, which may include an identifier associated with the contact (e.g., a name, nickname, username, and the like). Non-limiting examples may be "Locate John's Car," "Locate John," "Johnny Boy 123," or "John's Location."

Figure 7:
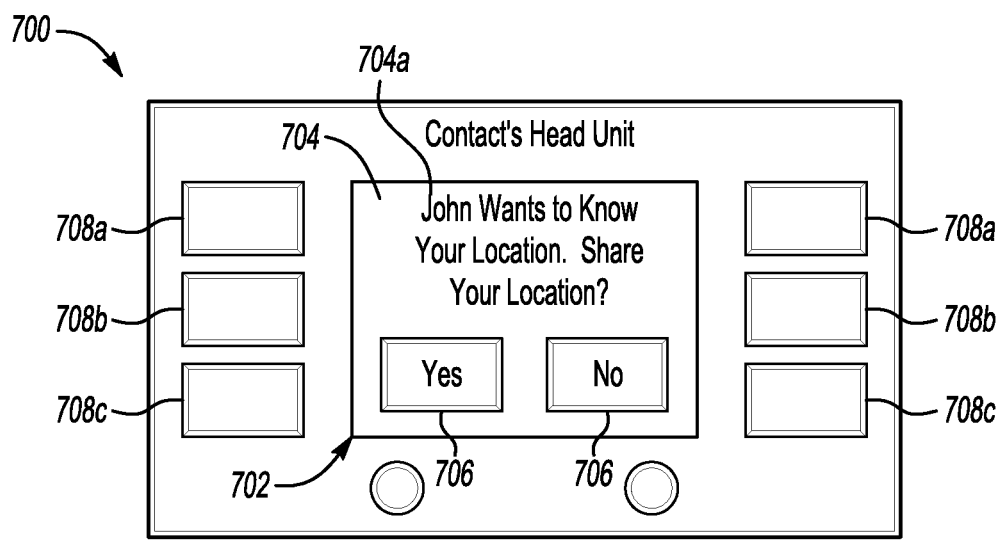
FIG. 7 is a non-limiting example of a message output to a contact on a communication device, e.g., a head unit, requesting the contact to share location information.

Upon the vehicle user inputting the command and the command being received by the head unit 104, a call may be made from the head unit 104 (via the embedded modem 132 or the ND 138) and, upon making a connection, a text-based message may be transmitted for display at the contact's communication device (block 204). FIG. 7 illustrates a non-limiting example of a communication device 700 (shown in FIG. 7 as a head unit 700) which receives a text-based message requesting the contact to share location. The text-based message may include a request to share the contact's location. In response, the user may accept or decline the request.

Additionally or alternatively a text-based message may be transmitted to the contact's communication device without making a call to the device (block 204). The text-based message may be received at the communication device 700 as a server pushed SMS message or an electronic mail message.

The message may be received by the contact's communication device 700 and the text-based message may be automatically displayed on the communication device display 702. As shown in FIG. 7, the text-based message may include an identity of the requester. One or more packets of data may be transmitted from the vehicle head unit 104 which may include an identifier which is used to trigger an automatic display of the message on the contact's communication device 700. Further details of the operation of the communication device 700 will be described with respect to FIG. 7 below.

At times, a contact may be using the display, e.g., while using the navigation system. In such cases, the message may be displayed on a portion of the display since the display is already in use. In other embodiments, the message may be temporarily displayed on the full display 702 until a response is input by the contact. The display may automatically revert back to the vehicle application in use upon a response being input. In yet alternative embodiments the request to share location may be output audibly in the vehicle.

Based on the contact's response to the message, the contact's location may or may not be shared and sent to the vehicle head unit 104 (block 206). The contact may decline to share location information. Alternatively, a response may not be received at the contact's communication device to the request for sharing location information. A timeout period may be activated when the request is received by the communication device. If the request is not acted upon within a predefined period of time, the request is terminated. A message may be displayed on the head unit display 110 that the contact has declined or the user has not responded. Accordingly, the location is not shared (block 210).

If the contact accepts the request (block 206), the acceptance may be transmitted to the vehicle head unit 104. The contact's location may be output via the head unit 104 which may represent that the contact has shared location information (block 208). In some embodiments, a message may be output (audibly or visually), after the contact accepts the request, that the contact is being located. For example, the message may state "Please wait while your contact is located."

Figure 3:
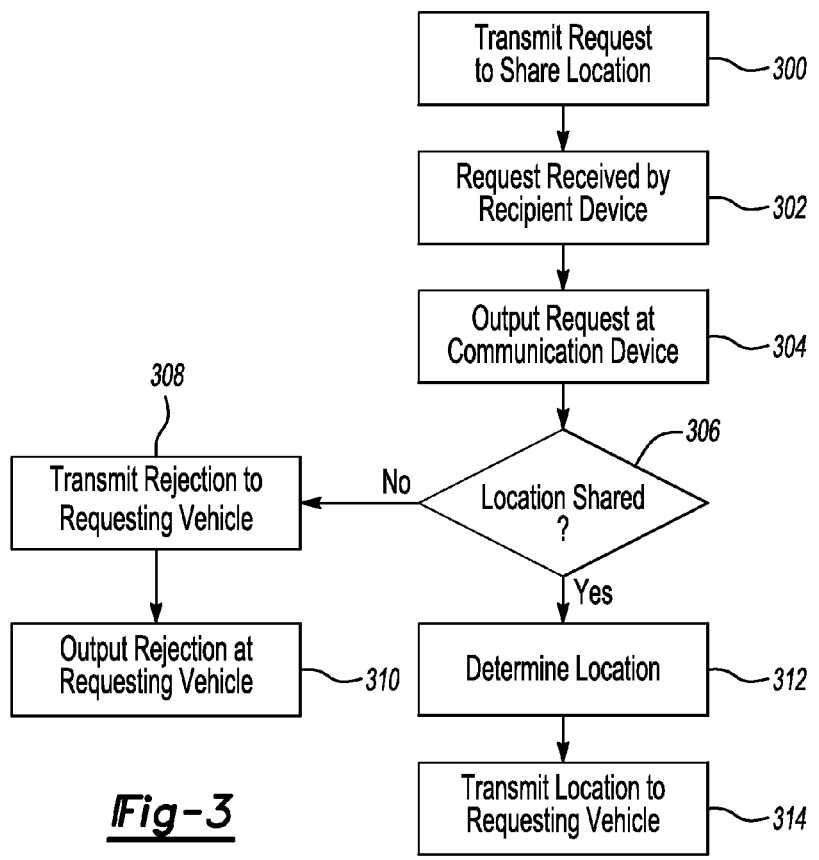
FIG. 3 is a process at the contact's communication device for determining and sharing a contact's location.

The location of the contact may be determined through one or more locating methods as will be described with respect to FIG. 3 which illustrates the process performed at a contact's communication device for sharing location information. The request to share location may be transmitted from the vehicle head unit 104 to one or more communication device of one or more of the vehicle user's contacts (block 300). The request may be transmitted wirelessly over a cellular connection 136. Alternatively, the request may be transmitted over the Internet using, for example, WiFi 140. The request may be received by the contact's communication device (block 302).

The communication device may be nomadic device or, as shown in a non-limiting embodiment in FIG. 7, a vehicle head unit. The request to locate the contact from the vehicle user is output at the communication device (block 304). The output may be audible and/or visual. A non-limiting example of a visual output is shown in FIG. 7. Whether the request is output on a nomadic device or a head unit may depend upon whether the contact is in a vehicle or not.

In some embodiments, the request may be defaulted to contacting the contact in the vehicle (e.g., determining the location of the contacts by locating the vehicle head unit 700). If the location cannot be determined, then the request may be sent to the contact's nomadic device. In some embodiments, the one or more contacts may be associated with multiple numbers (e.g., a phone number of the embedded phone and a phone number of a mobile phone) which may be stored on the head unit 104. In other embodiments, the vehicle user may manually instruct contacting the contact using different contact information in response to one or more messages output via the head unit 104 that the contact could not be reached using the default contacting method.

When the request is received and output at the communication device, the output message may ask the contact(s) whether or not to share location information to which the contact(s) may accept (e.g., allow location information to be shared) or decline (e.g., location information is not shared) (block 306). If the request is declined, a rejection of the request may be transmitted to the requesting vehicle (and received at the head unit 104) (block 308). As described above, in some embodiments, the rejection may be sent if the request is not answered within a timeout period. The rejection may be output in the requesting vehicle (block 310).

If the contact(s) accepts the request (block 306), the location of the contact(s) may be determined (block 312). The acceptance may be orally or tactually input by the contact(s) or it may be an automatic acceptance. For example, at the communication device, the contact(s) may set the requests from the requester to be automatically accepted. The location may be determined through multiple tracking methods. One tracking method uses GPS tracking. When the request is accepted by the contact(s), GPS data may be received by the contact's communication device from one or more GPS satellites and the GPS data transmitted to the user's head unit 104 (block 314). Another tracking method uses cellular triangulation. The location of a contact is determined by pinging one or more cellular towers nearest to the contact's communication device and, based on information received from the cellular tower(s) such as signal strength and time lag, the location of the communication device can be determined. The location information is transmitted to the vehicle head unit 104 (block 314). In some embodiments, both methods may be used. In some embodiments, while the contact location is being determined, a message may be output at the head unit 104 notifying the vehicle user of the status.

Figure 4:
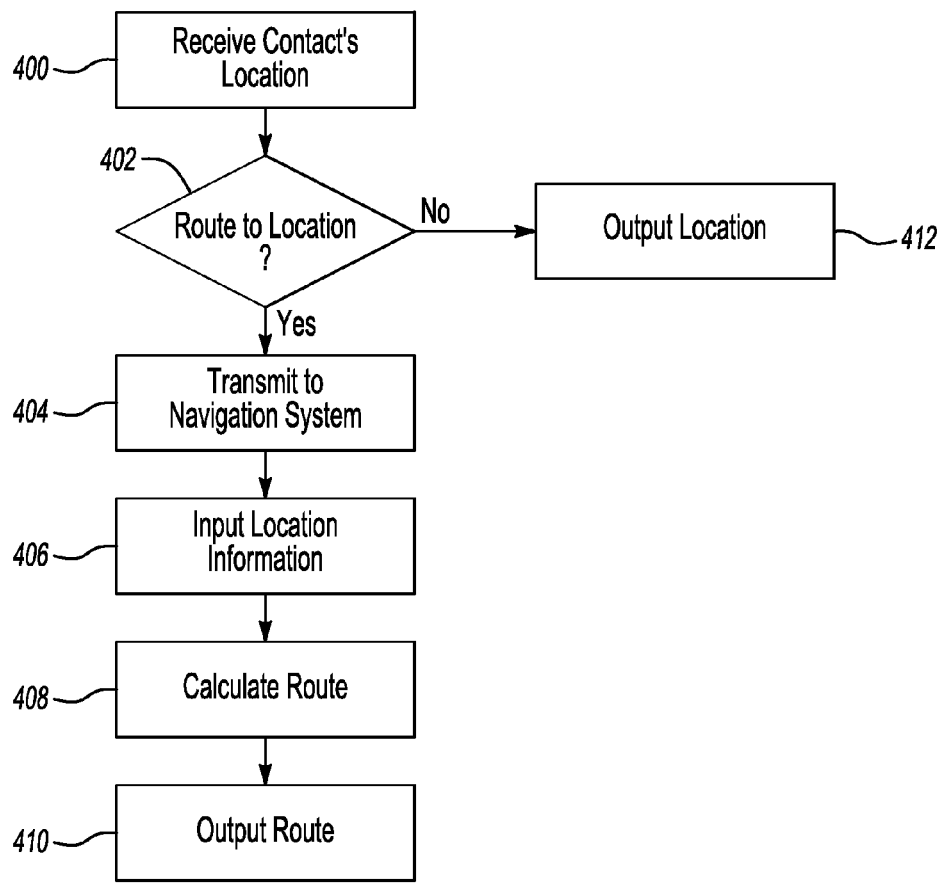
FIG. 4 is a process for receiving and routing to the contact's location in a vehicle.

When the location information is received in the vehicle, the vehicle user may or may not navigate to the contact's location. FIG. 4 illustrates the operation in the vehicle once the location information is received. The location information transmitted from the contact's communication device may be received at the vehicle head unit 104 (block 400). A message may be output asking whether the vehicle user wants to be routed to the contact's location (block 402). If not, the contact's location may be output via the head unit 104 visually and/or audibly (block 412). The location may be output as an address, point of interest (POI), highway or freeway location, cross street, street name, or the like.

The vehicle user may alternatively input a command (e.g., and without limitation, an acceptance to being routed to the contact) to navigate to the contact (block 402). The location of the contact(s) may be transmitted to the navigation module 146 (block 404) from which one or more routes may be calculated. The location information may be input as the destination for determining the route (block 406). The current location of the vehicle (or the VCS) may be determined for obtaining the starting point of the route. The location of the one or more contacts may be received at the head unit 104 as latitude and longitude coordinates. When the location information is received by the navigation module 146, routing information to the location may be calculated and output. In some embodiments, the location information may be input to the navigation module 146 as, without limitation, an address, partial address, point on a highway, point of interest (POI), and the like.

Based on the input location information, the route may be calculated by the navigation module 146 (block 408). The calculated route may be output via the head unit 104 (block 410). The output may be visual (e.g., on display 110) and/or audible (e.g., via speakers 128).

In some embodiments, the vehicle user may send a single request to multiple contacts. The vehicle user may select the multiple contacts to whom to send the request (e.g., from a menu of contacts to whom the request can be sent such as a contact list). The location of the contacts may be output via the head unit 104 on a navigation map showing the contacts' locations and/or listing the contacts' locations. The vehicle user may be navigated to each contact based on proximity to the vehicle user. In some embodiments, where the location of the contact(s) has changed, the route schedule may be revised according to proximity of the one or more contacts to the vehicle user.

Additionally or alternatively, the vehicle user may define the route schedule according to the location of the contacts. The route to each contact may be calculated individually with each instruction from the vehicle user to route to each contact's location. Alternatively or additionally, the route schedule may be defined by the user and each contact in the schedule automatically routed to after the completion of a route. When instructions are received (whether manually or automatically) to route to a contact, the location of a contact in the route schedule may be confirmed before calculating the route. In some cases, a contact may change location in which case the location in the route schedule is inaccurate. The location is confirmed after the contact is identified (e.g., automatically according to the schedule or based on user selection as described immediately above). The process for confirming the location of a contact is described above with respect to the process for determining a location of a contact. If the contact's location has changed, the location information of the contact will be updated and a route to the new location calculated.

In another non-limiting example, multiple users may track each other from their vehicle head unit while travelling to a common destination. The location of each vehicle may be displayed and tracked on each vehicle's navigation map.

Figure 5:
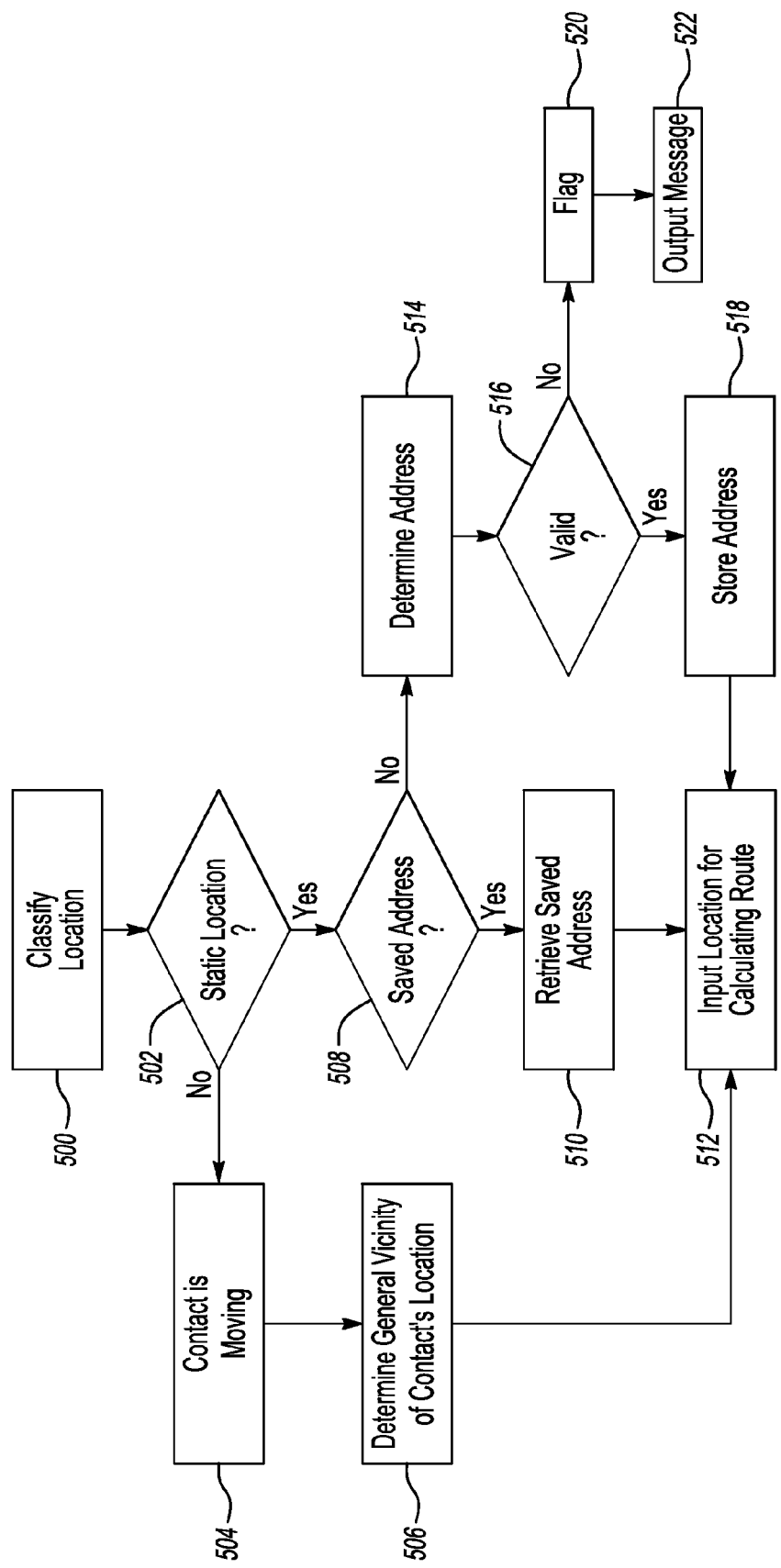
FIG. 5 is a process for determining the location of the located contact to input into a vehicle navigation system.

Inputting the location for calculating a route may include determining a status of the location as to whether it is a static location or changing. FIG. 5 illustrates a process for determining the location status. When the location is received at the head unit 104, the location may be given a classification as static or changing (block 500) which is used to determine the output to the vehicle user. Whether a contact's location is static or moving is based on the location information determined from the contact's communication device (e.g., based on GPS data and/or cellular triangulation).

If it is determined that is not static based on the location information (block 502), it is determined that the contact is moving (block 504). When the contact is moving (e.g., in a moving vehicle), a specific address cannot be determined to input to the navigation system for calculating a route. In such a case, a general vicinity or area of the contact's locations may be determined (block 506) and used for routing to the contact's location. As non-limiting examples, the contact may be identified as being on a highway or freeway (e.g., I-95 North), a street or road (e.g., "X" Avenue or "A" Road), or the like. When the contact is moving, the output via the head unit 104 may display the contact's location moving on the navigation map. In some embodiments, the location of the contact may be showed with respect to the location of the user's vehicle. Such tracking may be used by the vehicle user to identify where the contact is with respect to the vehicle user's location. In some embodiments, the tracked location of the moving contact may be output as a distance from the user's vehicle (e.g., stating visually and/or audibly that the contact is X miles or kilometers from the user). In some embodiments, the general vicinity of the contact's location may be specifically identified (e.g., and without limitation, Exit "N" on I-95 North, "X" Avenue between "A" road and "B" road, or the cross streets of "X" Avenue and "A" Road).

If the contact's location is static, an address may be determined from the contact's location. The vehicle user may have navigated previously to the contact's location and the address stored in memory 108 or the location may be otherwise saved as an address (e.g., in memory 108 or on the user's nomadic device 138). Locations that are stored may additionally include, but are not limited to, points of interest (POI) and locations stored by the vehicle user. If the address is stored in memory (block 508), the address may be retrieved from memory (block 510) and the location input as destination information for calculating the route (block 512). In some embodiments, database 150 or another database (which may or may not be local to the head unit 104) may be used to lookup and retrieve the address information based on the received location information.

As shown in FIG. 4, after the location information is input (block 406) as destination information, the route is calculated (block 408) and output (block 410). In some embodiments, by using a saved address, less information may be processed for determining the destination location (i.e., the contact's location) thereby conserving system 102 resources. If the location is not a saved/stored address (block 508), the address may be determined based on the location information obtained from, for example, GPS tracking and/or cellular triangulation (block 514).

Figure 6:
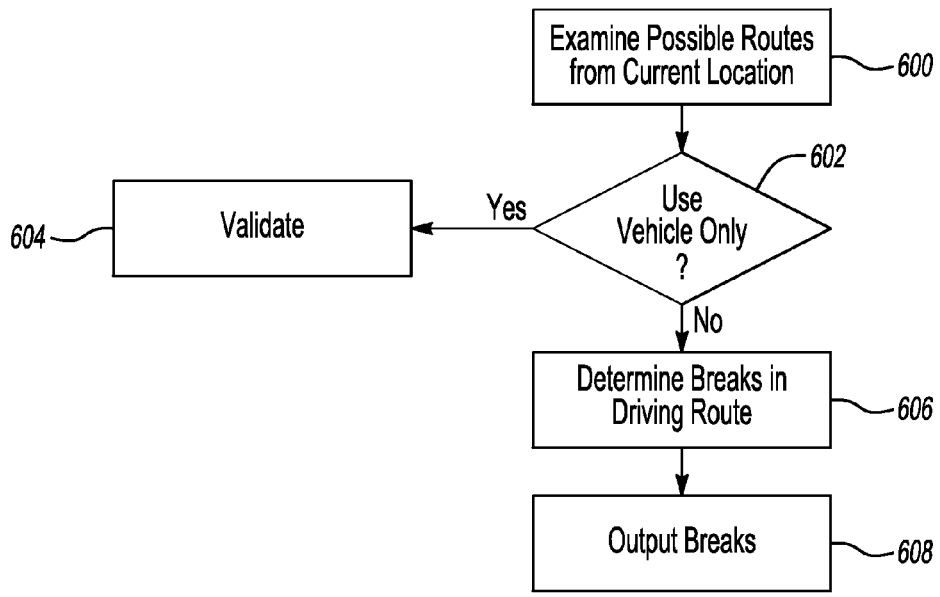
FIG. 6 is a process for verifying that a determined location is drivable.

The address may be validated (block 516). Validating the address may be used to confirm that the destination is navigable by vehicle and/or to confirm whether or not the vehicle user is given additional information about the contact's location. Referring to FIG. 6, a process is shown for validating the determined address. Details of the validation process will be described below with reference to FIGS. 5 and 6.

After the location is received and the address determined, logic may be executed from examining and evaluating possible routes to the destination (e.g., the contact's location) from the vehicle's current location (block 600). As part of the evaluation, it may be determined whether in any one route to the destination can be reached by vehicle only (block 602). If there is at least one route that can be navigated to using the vehicle, then the route is validated (block 604). The validated address may be stored in memory 108 (block 518). The validated route may be input as the destination for calculating the route (block 512).

Referring back to FIG. 6, if the evaluation indicates that any route cannot be navigated using a vehicle (block 602), one or more breaks in the driving route may be determined (block 606) and the breaks in the route output to the vehicle user (block 608). A route may not be drivable by vehicle if the user has to leave the vehicle in order to complete the route. As one non-limiting example, the route may not be drivable if the user has to use a different mode of transportation to complete the route.

Referring back to FIG. 5, where the route cannot be completed in a vehicle, a flag or other identifier may be set indicating that the route is not reachable by vehicle (block 520). In response to the flag, additional information may be output as a message to the vehicle user (block 522). The additional information may be an error message that a route to the contact's location cannot be determined. Additionally or alternatively, the message may provide a point to which the route is drivable and that another mode of transportation is required to complete the route.

In some embodiments, the flagged destination may also be stored in memory. The vehicle user may be notified that the route is not fully drivable if the contact is in the same location and vehicle user later attempts to navigate to the location.

FIG. 7 shows a non-limiting example of a head unit 700 which displays a message to the contact in response to a request for sharing location information. The message may alternatively be display on the contact's nomadic device, e.g., a mobile phone.

The message 704 may be displayed on the head unit display 702 as a request to share the contact's location. The message may include an identification 704a of the person requesting the location information. In the non-limiting example in FIG. 7, the identification information is the requester's name. Other non-limiting examples may include a telephone number, username, and the like.

The contact may accept or decline using graphical buttons 706 and/or soft buttons 708. The soft button(s) for transmitting instructions with respect to sharing location information may correlate with the location of the instructions on the display 702. As a non-limiting example, buttons 708c may be selected to instruct whether or not to share location information. Additional details and embodiments relating to the contact's communication device are described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for determining a location of a contact, the system comprising:
   an in-vehicle infotainment (IVI) unit comprising one or more in-vehicle interfaces for receiving and transmitting information and configured to:
   receive input at the IVI identifying one or more contacts remote from the IVI unit to locate;
   transmit a first request to locate the one or more contacts remote from the IVI unit without making a voice call to the one or more contacts, the one or more contacts associated with a first remote communication device;

if unsuccessful at receiving a response after transmission of the first locate request to the first remote communication device of the one or more contacts, automatically transmit a second request from the IVI unit to a second remote communication device of the one or more contacts to locate the one or more contacts;

upon successful transmission of the locate request, receive at the IVI unit a response to the locate request transmitted from the first or second remote communication device of the one or more contacts;

if the response is to share a location,
receive the location of the one or more contacts; and
input location information to a navigation module of the IVI unit for calculating a route to the one or more contacts' location if instructions to navigate to the location are also received; and output information relevant to a status of the response to the request to locate if the response is to not share the location or if instructions to navigate are not received.

2. The system of claim 1 wherein the first and second remote communication devices of the one or more contacts are at least one of a mobile phone or a vehicle-based embedded phone.

3. The system of claim 1 wherein the response is automatically transmitted from the communication device based on an identity of a requester.

4. The system of claim 1 wherein the IVI unit is further configured to output a request to navigate to the location for receiving instructions to navigate to the location.

5. The system of claim 1 wherein, if instructions to navigate to the location are not received, the information relevant to the status is the location of the one or more contacts.

6. The system of claim 5 wherein the location of the one or more contact is output as an address, partial address, point of interest, location on a street, a highway location, or a cross street.

7. The system of claim 1 wherein the response to not share the location is based on a user input rejection of the request.

8. The system of claim 1 wherein the response to not share the location is due to an expiration of a timeout period for response by the one or more contacts to the request to locate.

9. The system of claim 1 wherein the first remote communication device is a default remote communication device for determining the location of the one or more contacts.

10. The system of claim 9 wherein the default remote communication device is an embedded communication device in a vehicle.

11. The system of claim 1 wherein the transmitted request includes a phone number of an embedded device in a vehicle of the one or more contacts.

12. The system of claim 1 wherein the IVI is configured to detect a second remote communication device of the one or more contacts, wherein the second request is transmitted upon detecting the second remote communication device.

13. A computer-implemented method of determining a location of one or more contacts, the computer-implemented method comprising:

receiving input at a vehicle computer identifying one or more contacts remote from a vehicle to locate;

transmitting over a vehicle network one or more messages based on the input to a communication module in the vehicle to transmit a first request to share a location of the one or more contacts for output on a first remote communication device of the identified one or more contacts;

if the first request fails, automatically transmitting a second request to share a location of the identified one or more contacts for output on a second remote communication device of the identified one or more contacts, wherein the first or second request is transmitted regardless of an ongoing communication with the identified one or more contacts;

receiving via the in-vehicle communication module a response to the first or second request;

transmitting over the vehicle network the response from the in-vehicle communication module to the vehicle computer;

from the response, determining at the vehicle computer that a location of the one or more identified contacts is shared in response to the first or second request;

determining the location of the one or more identified contacts at the vehicle computer; and outputting the location of the one or more identified contacts.

14. The computer-implemented method of claim 13 further comprising outputting one or more messages at the vehicle computer requesting instructions for navigating to the location.

15. The computer-implemented method of claim 14 further comprising calculating a route to the one or more contacts' location based on the location of the one or more contacts in response to receiving instructions to navigate to the location.

16. The computer-implemented method of claim 13 wherein the input identifying the one or more contacts is a name or a phone number of the one or more contacts.

17. The computer-implemented method of claim 13 further comprising determining that the first request failed,
wherein determining that the first request failed comprises:
transmitting a first connection request via the in-vehicle communication module to the first remote communication device of the one or more identified contacts;
determining that a connection cannot be established with the first communication device of the identified one or more contacts;
wherein transmitting the second request comprises:
transmitting a second connection request via the in-vehicle communication module to the second remote communication device of the identified one or more contacts,
wherein the request to share the location is transmitted once the second connection is established.

18. The computer-implemented method of claim 17 wherein the first and second remote communication devices of the one or more identified contacts are at least one of a mobile phone or a vehicle-based embedded phone.

19. The computer-implemented method of claim 13 wherein the request to share a location is received on the communication device of the identified one or more contacts as a text message.

20. The computer-implemented method of claim 13 wherein determining the location of the one or more contacts includes determining that the contact is in a moving vehicle.

21. The computer-implemented method of claim 20 wherein, based on determining that the contact is in a moving vehicle, the location of the one or more contacts is determined as a general vicinity or area.

22. A non-transitory computer program product embodied on a non-transitory computer readable medium for determining a location of one or more contacts, the computer program product having computer-readable instructions for:

receiving input defining a request to locate one or more contacts remote from a vehicle;

based on the request and without making a voice call to the one or more contacts, transmitting one or more first messages via a vehicle computer to one or more first communication devices of the one or more contacts requesting instructions from the one or more contacts to share a location;

determining that the transmission of the one or more first messages was not completed;

identifying a second remote communication device of the one or more contacts, based on determining that the transmission was not completed, automatically transmitting one or more second messages via the vehicle computer to one or more identified second communication devices of the one or more contacts requesting instructions from the one or more contacts to share a location;

receiving instructions with respect to sharing the location of the one or more contacts;

based on the instructions, determining a location of the one or more contacts;

outputting at the vehicle computer one or more requests for instructions to navigate to the location of the one or more contacts;

receiving user instructions at the vehicle computer to navigate to the location of the one or more contacts; and transmitting computer instructions for calculating and outputting a route based on the location.

23. The non-transitory computer program product of claim 22, wherein the location is determined for multiple contacts, the computer program product further comprising instructions for receiving a route schedule for routing to each of the locations of the multiple contacts, wherein the computer instructions for calculating and outputting the route are transmitted according to the route schedule.

24. The non-transitory computer program product of claim 23 wherein the route schedule is based on proximity to the location of at least one of the multiple contacts.

25. The non-transitory computer program product of claim 23 further comprising instructions for confirming the location of at least one of the multiple contacts before moving to another location according to the route schedule.

26. The non-transitory computer program product of claim 22 further comprising instructions for determining that the one or more contacts is moving, wherein the instructions for calculating the route are instructions for calculating the route to the one or more contacts based on proximity to the vehicle.

27. The non-transitory computer program product of claim 22 further comprising instructions for:
 determining that the route to the location of the one or more contacts is not navigable by vehicle only; and
 outputting one or more messages at a vehicle computer based on the determination.

* * * * *